(12) United States Patent
Chiang

(10) Patent No.: US 7,669,860 B2
(45) Date of Patent: Mar. 2, 2010

(54) TOOL RETAINING OR CONNECTING DEVICE

(75) Inventor: Wen Hung Chiang, Taichung Hsien (TW)

(73) Assignee: Hsin Ying Enterprise Co., Ltd., Wantien Tsuen Dadu Hsiang, Taichung Hsien (TW)

( * ) Notice: Subject to any disclaimer, the term of this patent is extended or adjusted under 35 U.S.C. 154(b) by 884 days.

(21) Appl. No.: 11/494,010

(22) Filed: Jul. 27, 2006

(65) Prior Publication Data
US 2008/0023924 A1    Jan. 31, 2008

(51) Int. Cl.
*B23B 31/06* (2006.01)
*B23B 31/107* (2006.01)

(52) U.S. Cl. .......... 279/143; 279/46.7; 279/82; 279/128; 279/137

(58) Field of Classification Search ........ 279/46.7, 279/75, 82, 137, 143–145; 7/158, 165; B23B 31/06, B23B 31/107
See application file for complete search history.

(56) References Cited

U.S. PATENT DOCUMENTS

| | | | | |
|---|---|---|---|---|
| 5,928,241 A * | 7/1999 | Menut et al. | ............ | 606/80 |
| 6,199,872 B1 * | 3/2001 | Hasan | ............ | 279/30 |
| 6,311,989 B1 * | 11/2001 | Rosanwo | ............ | 279/75 |
| 6,364,318 B1 * | 4/2002 | Bedi et al. | ............ | 279/22 |
| 6,457,916 B2 | 10/2002 | Wienhold | ............ | 408/240 |
| 6,511,268 B1 * | 1/2003 | Vasudeva et al. | ............ | 408/239 R |
| 6,554,292 B1 * | 4/2003 | Rohm | ............ | 279/137 |
| 6,929,266 B2 * | 8/2005 | Peters et al. | ............ | 279/82 |
| 6,973,858 B2 * | 12/2005 | Huang | ............ | 81/177.85 |
| 7,086,813 B1 * | 8/2006 | Boyle et al. | ............ | 408/239 R |
| 7,195,247 B2 * | 3/2007 | Shu | ............ | 279/75 |
| 7,306,396 B1 * | 12/2007 | Chen et al. | ............ | 403/327 |
| 7,448,302 B2 * | 11/2008 | Huang | ............ | 81/438 |
| 7,469,909 B2 * | 12/2008 | Strauch et al. | ............ | 279/75 |
| 2006/0097464 A1 * | 5/2006 | Strauch et al. | ............ | 279/75 |
| 2007/0108706 A1 * | 5/2007 | Cornwell et al. | ............ | 279/143 |
| 2008/0217870 A1 * | 9/2008 | Shibata | ............ | 279/82 |
| 2008/0246233 A1 * | 10/2008 | Wienhold | ............ | 279/82 |

* cited by examiner

*Primary Examiner*—Eric A Gates
(74) *Attorney, Agent, or Firm*—Charles E. Baxley

(57) ABSTRACT

A tool retaining device includes a housing having an engaging hole and having a chamber for slidably receiving a tool stem, the tool stem includes a socket opening for receiving a tool member which is also slidably engaged in the engaging hole of the housing, for allowing the tool member to be rotated by either the tool stem or the housing. The tool member may also be moved relative to the housing for changeably coupling tool members or tool bits having different lengths, and may be selectively moved into the housing, for allowing another tool element to be selectively engaged with the engaging hole of the housing when the tool member is moved into the housing.

20 Claims, 5 Drawing Sheets

TOOL RETAINING OR CONNECTING DEVICE

BACKGROUND OF THE INVENTION

1. Field of the Invention

The present invention relates to a tool retaining or connecting device, and more particularly to a tool retaining device changeably coupling or retaining different tool members or tool bits having different lengths.

2. Description of the Prior Art

Typical tool devices or tool shanks or tool extensions may comprise an engaging hole formed in one end for receiving a tool member or tool bit, and a retaining or connecting device or quick-change chuck device attached onto the one end thereof for engaging with and for retaining or connecting the tool member or tool bit to the tool devices or tool shanks or tool extensions.

For example, U.S. Pat. No. 6,457,916 to Wienhold discloses one of the typical locking quick-change chuck assemblies comprising a chuck hub having a longitudinally extending bore therein for receiving a tool member or tool bit, and a shuttle slidably disposed in the longitudinally extending bore and movable between a first release position and a second lock position, and a compression spring urging the shuttle to engage with the tool member or tool bit, and a shuttle detent ball and a bit detent ball engaged in the chuck hub for engaging with the shuttle and the tool member or tool bit respectively.

However, the typical locking quick-change chuck assemblies comprise a rather complicated configuration that may not be easily manufactured and assembled and that may include a greatly increased manufacturing cost. In addition, the chuck hub is designed and arranged for receiving a tool member or tool bit of a particular or predetermined length, but may not be used for receiving the other tool members or tool bits having different lengths.

The present invention has arisen to mitigate and/or obviate the afore-described disadvantages of the conventional tool retaining devices.

SUMMARY OF THE INVENTION

The primary objective of the present invention is to provide a tool retaining or connecting device for changeably coupling or retaining different tool members or tool bits having different lengths.

In accordance with one aspect of the invention, there is provided a tool retaining device comprising a housing including an engaging hole formed in a first end thereof and having a non-circular cross section, and including a chamber formed therein and communicating with the engaging hole of the housing, a tool stem slidably received in the chamber of the housing and including a socket opening formed therein and having a non-circular cross section, and a tool member engaged into the socket opening of the tool stem and slidably engaged in the engaging hole of the housing, the tool member including a non-circular cross section for engaging with the non-circular engaging hole of the housing and the socket opening of the tool stem and for allowing the tool member to be selectively rotated by either the tool stem or the housing, and the tool member is movable relative to the housing and selectively movable into the chamber of the housing.

A limiting device may further be provided for limiting the tool stem to move relative to the housing. The limiting device includes a first limiting groove formed in the housing and communicating with the chamber of the housing, and a retaining ring engaged onto the tool stem for selectively engaging with the first limiting groove of the housing and for limiting the tool stem to move relative to the housing.

The housing includes a second limiting groove formed therein and communicating with the chamber of the housing for selectively engaging with the retaining ring. The second limiting groove of the housing is located closer to the first end of the housing.

The housing includes a positioning groove formed therein and communicating with the chamber of the housing for selectively engaging with and for positioning the retaining ring to the housing.

The tool stem includes an aperture formed therein and communicating with the socket opening of the tool stem for receiving a bit detent ball therein, the bit detent ball is extendible into the socket opening of the tool stem for engaging with the tool member and for anchoring the tool member to the tool stem.

The housing includes a receiving groove formed therein and communicating with the chamber of the housing for selectively engaging with and receiving the bit detent ball and for allowing the bit detent ball to be selectively disengaged from the tool member.

The housing includes a cavity formed therein and communicating with the chamber of the housing for receiving a stem detent ball, the stem detent ball is extendible into the chamber of the housing for engaging with the tool stem and for anchoring the tool stem to the housing.

The tool stem includes a depression formed in an outer peripheral portion thereof for receiving the stem detent ball and for solidly anchor the tool stem to the housing.

A control ferrule may further be provided and slidably attached onto the housing for selectively engaging with the stem detent ball and for anchoring the tool stem to the housing. The control ferrule includes a receiving groove formed therein for selectively receiving the stem detent ball and for allowing the stem detent ball to be selectively disengaged from the tool stem.

The housing includes a retaining ring engaged onto the housing, and the control ferrule includes a limiting groove formed therein for selectively engaging with the retaining ring and for selectively retaining the stem detent ball in engagement in the receiving groove of the control ferrule.

The housing includes a retaining ring engaged onto the housing, and the control ferrule includes a limiting groove formed therein for selectively engaging with the retaining ring and for selectively retaining the stem detent ball in disengagement from the receiving groove of the control ferrule.

The housing includes an anchoring device for engaging with and for anchoring the tool member to the housing. The anchoring device includes a spring-biased bit detent ball attached to the housing and extendible into the engaging hole of the housing for engaging with the tool member and for anchoring the tool member to the housing. The housing includes a spring member engaged thereon and engaged with the bit detent ball for biasing and forcing the bit detent ball to engage with the tool member.

A tool element may further be provided and selectively engageable into the engaging hole of the housing when the tool member is moved into the housing and received in the chamber of the housing. The housing includes a magnetic member attached thereto for attracting a tool element to the housing. The magnetic member includes a bore formed therein for slidably receiving the tool member.

Further objectives and advantages of the present invention will become apparent from a careful reading of the detailed

DETAILED DESCRIPTION OF THE PREFERRED EMBODIMENT

Figure 1:
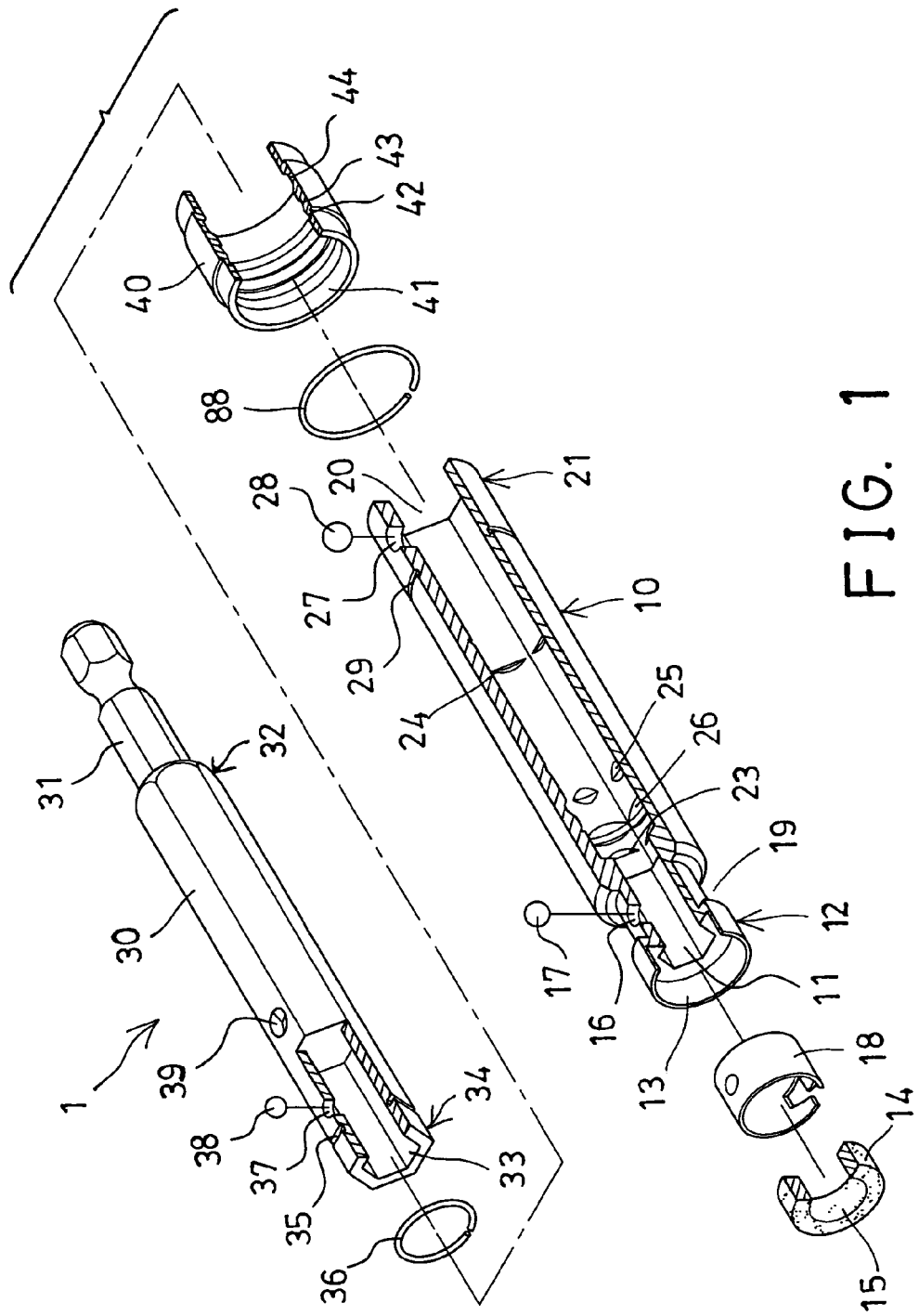
FIG. 1 is an exploded view of a tool retaining or connecting device in accordance with the present invention.
Figure 2:
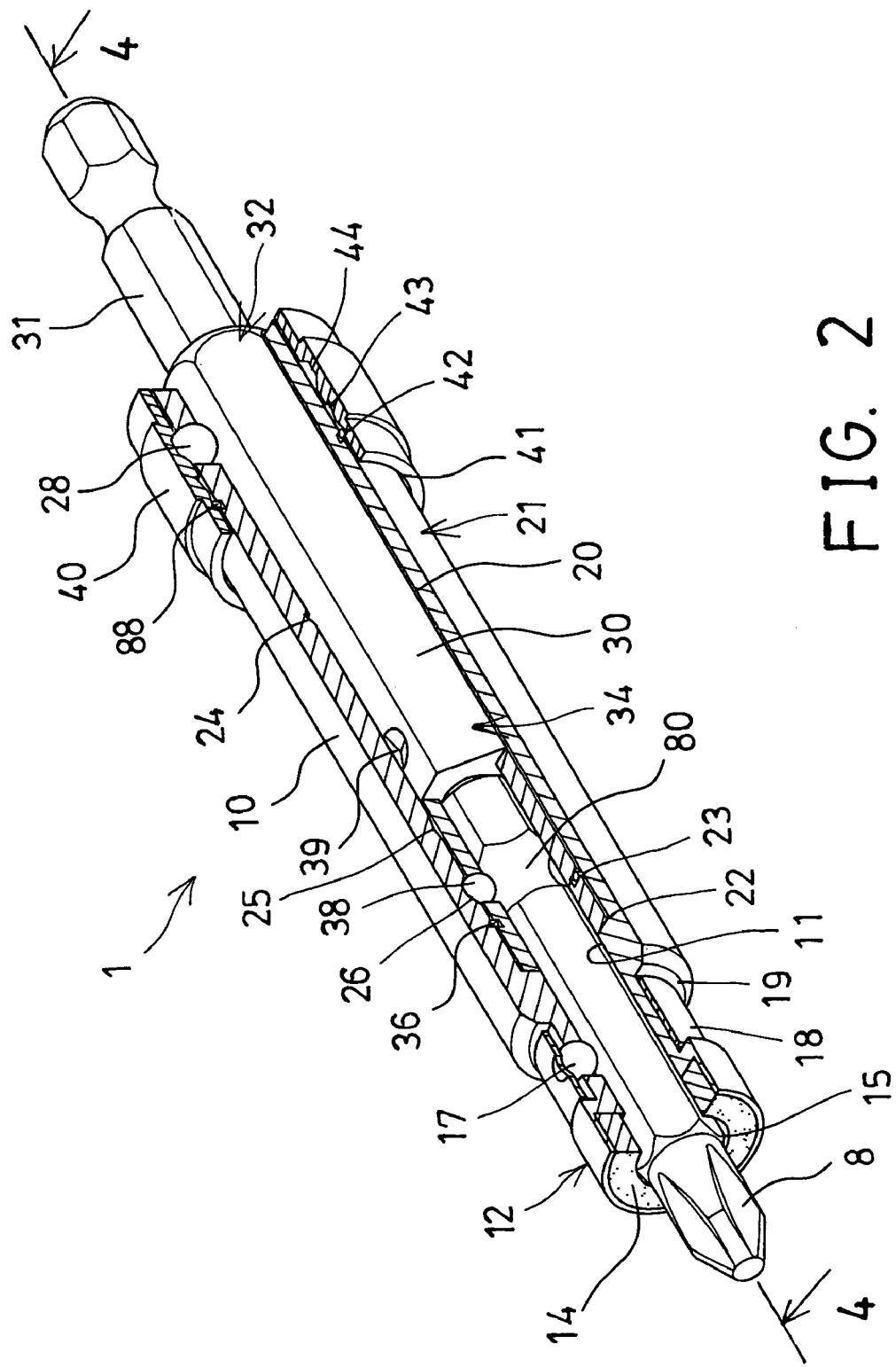
FIG. 2 is a perspective view of the tool retaining device, in which a quarter of the tool retaining device has been cut off for showing the inner structure or configuration of the tool retaining device.
Figure 3:
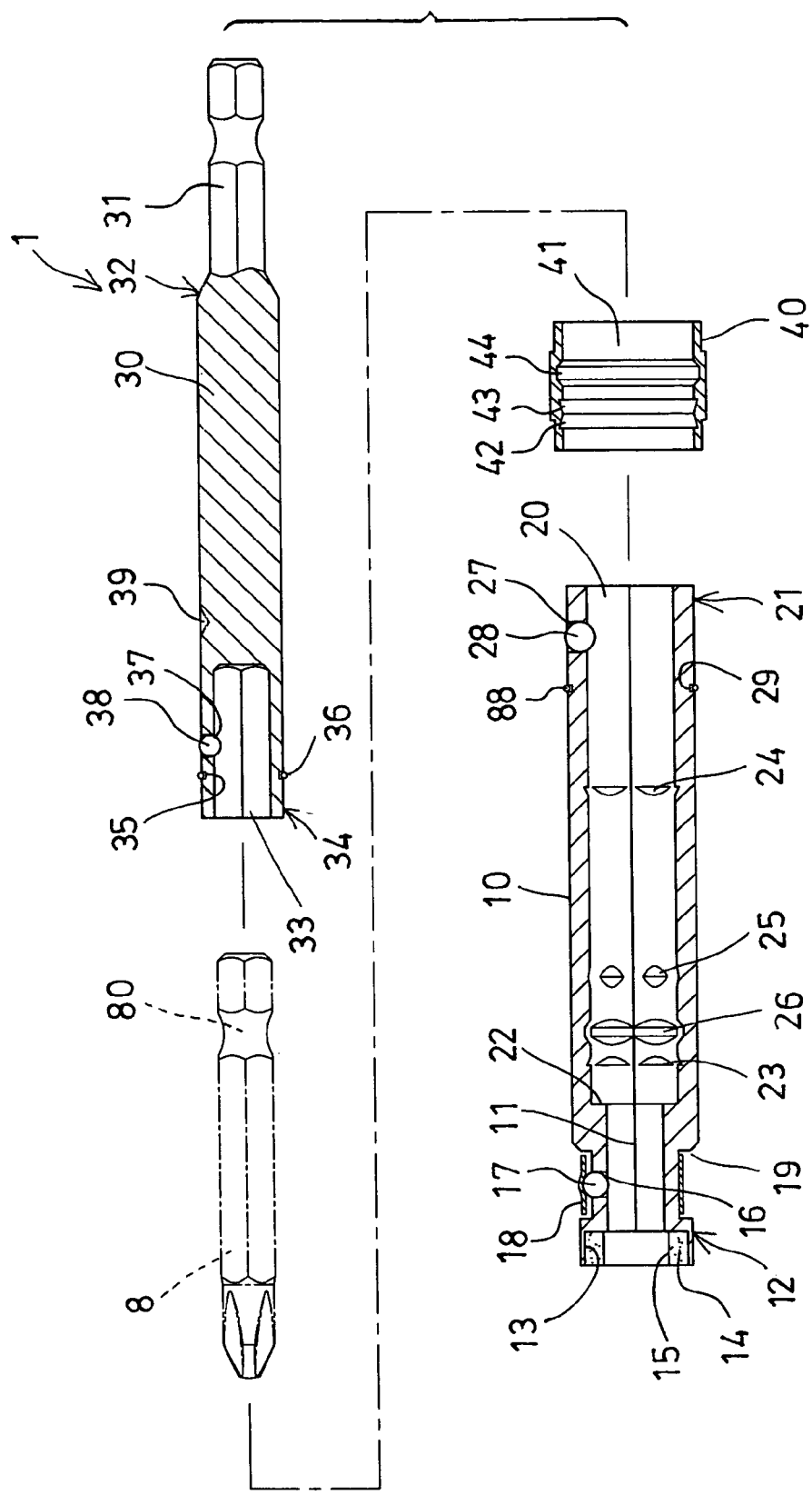
FIG. 3 is an exploded and cross sectional view of the tool retaining device.
Figure 4:
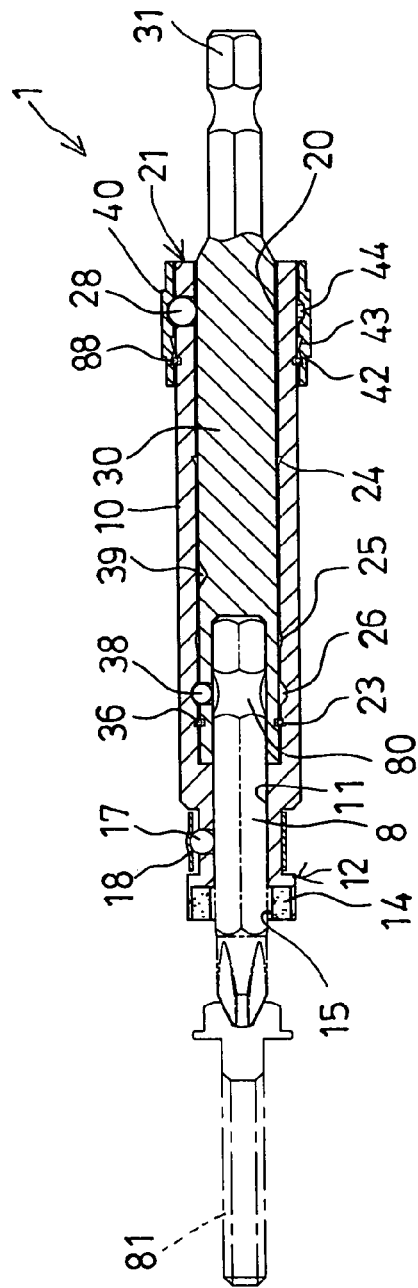
FIG. 4 is a partial cross sectional view of the tool retaining device taken along lines 4-4 of FIG. 2, illustrating the operation of the tool retaining device.

Referring to the drawings, and initially to FIGS. 1-4, a tool retaining or connecting device 1 in accordance with the present invention comprises an outer housing 10 including an engaging hole 11 formed in one end 12 thereof and preferably having a non-circular cross section, such as a hexagonal cross section for receiving and for engaging with a tool member 8, such as a tool bit 8 and for allowing the tool member or tool bit 8 to be rotated or driven by the housing 10. The housing 10 further includes an enlarged compartment 13 formed in the one end 12 thereof and communicating with the engaging hole 11 of the housing 10 for receiving a ring or annular shaped magnetic member 14 which includes a bore 15 formed therein for slidably receiving the tool member or tool bit 8 (FIGS. 2 and 4-5).

The housing 10 further includes an orifice 16 formed in the one end 12 thereof and intersecting or communicating with the engaging hole 11 of the housing 10 for receiving a bit detent ball 17 therein which is partially extendible or engageable into the engaging hole 11 of the housing 10 for engaging with the tool member or tool bit 8 and for anchoring or retaining the tool member or tool bit 8 to the housing 10. A spring member 18, such as a ring or collar or annular shaped spring member 18 engaged onto the one end 12 of the housing 10 and engaged with the bit detent ball 17 for biasing or forcing the bit detent ball 17 to engage with the tool member 8 and thus to stably or solidly anchor or retain the tool member 8 to the housing 10. The spring-biased bit detent ball 17 may thus be used as an anchoring means or device 17 for engaging with and for anchoring the tool member 8 to the housing 10.

It is preferable that the housing 10 includes a peripheral channel 19 formed in the outer peripheral portion thereof for receiving the annular spring member 18 and for stably or solidly anchoring or retaining the annular spring member 18 on the housing 10. The annular spring member 18 may bias or force the bit detent ball 17 to engage with the tool member 8 and to stably or solidly anchor or retain the tool member 8 to the housing 10 at any selected or suitable position. The magnetic member 14 may also be used to act with the tool member 8 and to further stably or solidly anchor or retain the tool member 8 to the housing 10, and may also be used to act with the other tool elements 81, 82, 83 (FIGS. 4-6) for stably or solidly attracting or retaining the tool elements 81, 82, 83 to the housing 10.

Figure 5:
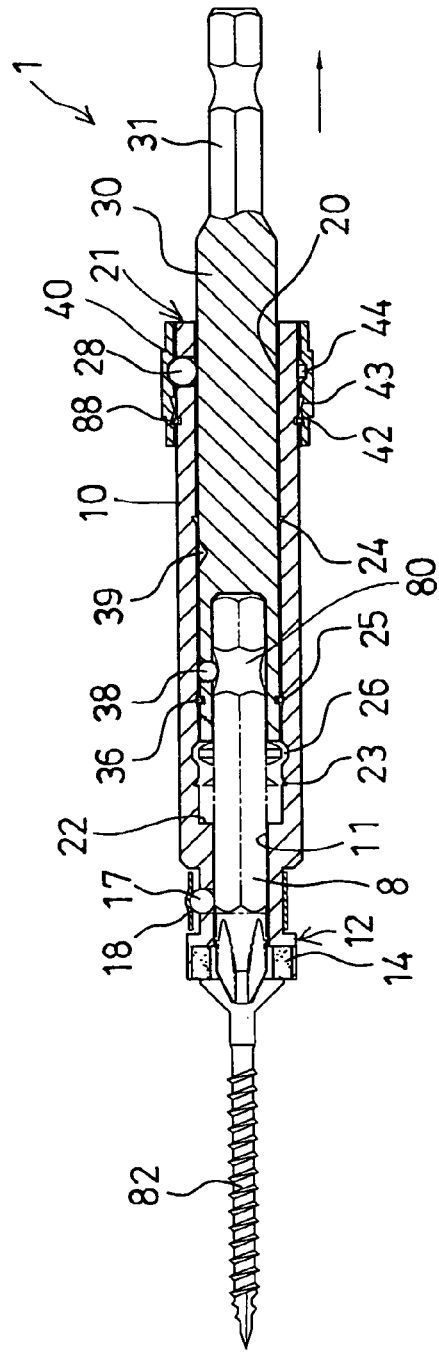
FIG. 5 is a partial cross sectional view similar to FIG. 4, illustrating the other application of the tool retaining device.
Figure 6:
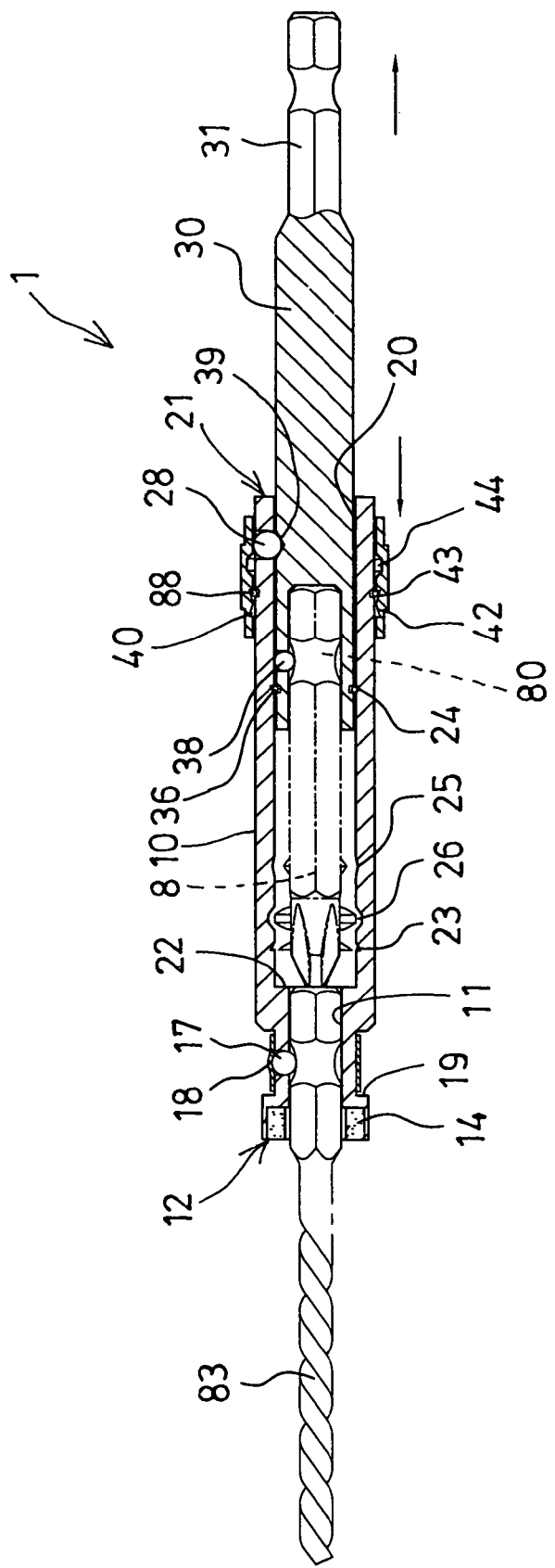
FIG. 6 is a partial cross sectional view similar to FIGS. 4 and 5, illustrating the further application of the tool retaining device.

The housing 10 further includes a chamber 20 formed in the intermediate portion and/or in the other end 21 thereof and communicating with the engaging hole 11 of the housing 10 for slidably receiving a tool stem 30 therein, it is preferable that the chamber 20 of the housing 10 includes an inner diameter greater than that of the engaging hole 11 of the housing 10 for forming an inner peripheral shoulder 22 therein and located between the chamber 20 and the engaging hole 11 of the housing 10 (FIGS. 3, 5-6). It is further preferable that the chamber 20 of the housing 10 includes a non-circular cross section, such as a hexagonal cross section for receiving and for engaging with the tool stem 30 that has the corresponding non-circular cross section, such as a hexagonal cross section, for allowing the tool stem 30 and the housing 10 to be rotated in concert with each other.

The tool stem 30 includes a shank 31 extended from one end 32 thereof and extended out of the housing 10 for coupling to various driving tool devices (not shown), such as the power tools or the power driving devices for allowing the tool stem 30 and thus the housing 10 to be rotated or driven by the driving tool devices, and includes a socket opening 33 formed in the other end 34 thereof and having a non-circular cross section corresponding to that of the tool member 8 for allowing the tool member 8 also to be selectively rotated or driven by the tool stem 30. The tool member 8 may be forced to move relative to the housing 10 or along the engaging hole 11 of the housing 10 by the tool stem 30 and may be selectively moved out of the housing 10 (FIGS. 2, 4-5) or may be selectively moved into or received in the housing 10 (FIG. 6).

The housing 10 further includes two peripheral limiting grooves 23, 24 formed therein, such as formed in the intermediate portion thereof and communicating with the chamber 20 of the housing 10, and a positioning groove 25 formed therein and located between the limiting grooves 23, 24 thereof, and a receiving groove 26 formed therein and also located between the limiting grooves 23, 24 thereof or located between one of the limiting grooves 23 and the positioning groove 25 thereof, in which the limiting grooves 23, 24 are ratchet grooves 23, 24 and one of the limiting grooves 23 is located closer to the one end 12 of the housing 10 and the other limiting groove 24 is located closer to the other end 21 of the housing 10.

The tool stem 30 includes a peripheral slot 35 formed in the outer peripheral portion thereof for receiving a clamping or retaining ring 36 which may be engaged with either of the limiting grooves 23, 24 of the housing 10 for limiting the tool stem 30 to move or to slide relative to the housing 10 and also for preventing the tool stem 30 from being disengaged from the housing 10. The retaining ring 36 and the limiting grooves 23, 24 of the housing 10 may thus be used as a limiting means or device for limiting the tool stem 30 to move or to slide relative to the housing 10. The retaining ring 36 may be received and positioned within the positioning groove 25 of the housing 10 for positioning the tool stem 30 to the housing 10 and also for allowing the retaining ring 36 to be disengaged from the positioning groove 25 of the housing 10. The tool stem 30 may also be engaged with the inner peripheral shoulder 22 of the housing 10 for further limiting the tool stem 30 to move or to slide relative to the housing 10.

The tool stem 30 includes an aperture 37 formed in the other end 34 thereof and intersecting or communicating with the socket opening 33 of the tool stem 30 for receiving another bit detent ball 38 therein which is partially extendible or engageable into the socket opening 33 of the tool stem 30 for engaging with the tool member 8 and for stably or solidly anchoring or retaining the tool member 8 to the tool stem 30. As shown in FIG. 4, when the other bit detent ball 38 is received or rested within the receiving groove 26 of the housing 10, the other bit detent ball 38 may be disengaged from a peripheral recess 80 of the tool member 8 for allowing the tool member 8 to be selectively engaged into or disengaged from the socket opening 33 of the tool stem 30.

The bit detent ball 38 may be forced to engage with the tool member 8 and to stably or solidly anchor or retain the tool member 8 to the tool stem 30 by the housing 10 when the bit detent ball 38 is moved relative to the housing 10 and disengaged from the receiving groove 26 of the housing 10. In addition, when the housing 10 is engaged with the bit detent ball 38 to force the bit detent ball 38 to engage with and to anchor the tool member 8, the tool member 8 may be moved relative to the housing 10 against the spring-biased bit detent ball 17 (FIG. 5) which, at this moment, may be used for anchoring and positioning the tool stem 30 to the housing 10 at selected positions.

The housing 10 further includes a cavity 27 formed in the other end 21 thereof and intersecting or communicating with the chamber 20 of the housing 10 for receiving a stem detent ball 28 therein which is partially extendible or engageable into the chamber 20 of the housing 10 for engaging with the tool stem 30 (FIG. 6) and for anchoring or retaining the tool stem 30 to the housing 10. The tool stem 30 includes a depression 39 formed in the outer peripheral portion thereof for receiving the stem detent ball 28 (FIG. 6) which may be stably or solidly engaged with the tool stem 30 to stably or solidly anchor and retain the tool stem 30 to the housing 10 and to prevent the tool stem 30 from being moved and disengaged from the housing 10. The housing 10 further includes a peripheral slot 29 formed in the outer peripheral portion thereof for receiving another clamping or retaining ring 88.

A sleeve or control ferrule 40 is slidably or rotatably attached or engaged onto the other end 21 of the housing 10 or includes a bore 41 formed therein for slidably receiving the housing 10, and includes two peripheral and/or ratchet limiting grooves 42, 43 formed therein and communicating with the bore 41 of the control ferrule 40 for receiving or engaging with the clamping or retaining ring 88 and for limiting the control ferrule 40 to move or to slide relative to the housing 10 and also for preventing the control ferrule 40 from being disengaged from the housing 10. The control ferrule 40 further includes a peripheral receiving groove 44 formed therein for selectively receiving the stem detent ball 28 (FIGS. 2, 4, 5) and for allowing the stem detent ball 28 to be selectively disengaged from the depression 39 of the tool stem 30 and thus for allowing the tool stem 30 to be selectively moved relative to the housing 10.

The stem detent ball 28 may be maintained in engagement in the peripheral receiving groove 44 of the control ferrule 40 and in disengagement from the depression 39 of the tool stem 30 when the clamping or retaining ring 88 is engaged with one of the limiting grooves 42 of the control ferrule 40, and the stem detent ball 28 may be maintained in disengagement from the peripheral receiving groove 44 of the control ferrule 40 and may be forced to stably or solidly engage with the depression 39 of the tool stem 30 (FIG. 6) in order to stably or solidly anchor and retain the tool stem 30 to the housing 10, particularly to retain the tool stem 30 in the inner portion of the housing 10, and to prevent the tool stem 30 from being moved and disengaged from the housing 10.

In operation, as shown in FIG. 4, the tool member 8 may be selectively moved out of the housing 10 by the tool stem 30 for engaging with the tool element 81 such as the bolt 81, and for allowing the tool element 81 to be rotated or driven by the housing 10 and the tool stem 30 and the tool member 8. The tool stem 30 may be engaged with the inner peripheral shoulder 22 of the housing 10 and/or the retaining ring 36 may be engaged with one of the limiting grooves 23 of the housing 10 for positioning or retaining the tool stem 30 to the housing 10, and for allowing the tool member 8 to be stably or solidly received and retained within the socket opening 33 of the tool stem 30 and the engaging hole 11 of the housing 10. It is preferable that the other bit detent ball 38 is received and retained within the receiving groove 26 of the housing 10 when the retaining ring 36 is engaged with the limiting groove 23 of the housing 10 for allowing the tool member 8 to be selectively engaged into or disengaged from the tool stem 30.

As shown in FIG. 5, the tool member 8 may be selectively moved into the housing 10 by the users or with the tool stem 30 until the retaining ring 36 is engaged with the positioning groove 25 of the housing 10. At this moment, the tool member 8 may be maintained in a partially outward extending position relative to the housing 10 or the tool member 8 may be partially extended out of the housing 10 for engaging with the other tool element 82, such as the wood screw or the treenail 82, and for allowing the tool element 82 to be rotated or driven by the housing 10 and the tool stem 30 and the tool member 8. The magnetic member 14 may be used to act with the tool element 81 and to stably or solidly attract or retain the tool element 81 to the housing 10 and also stably or solidly retain the tool member 8 in engagement with the tool element 81.

As shown in FIG. 6, the tool member 8 may further be selectively moved into the housing 10 with the tool stem 30 until the retaining ring 36 is engaged with the other limiting groove 24 of the housing 10 for allowing the tool member 8 to be completely received in the chamber 20 of the housing 10. At this moment, the other tool element 83, such as the drill bit 83 may be selectively engaged into the engaging hole 11 of the housing 10 for being selectively rotated or driven by the housing 10 and the tool stem 30 and the tool member 8, such that the tool elements 81-83 of different lengths may be selectively rotated or driven by the housing 10 and the tool stem 30 and the tool member 8 of the tool retaining or connecting device 1. The spring-biased bit detent ball 17 or the anchoring means or device 17 may also be used for engaging with and for anchoring the tool element 83 to the housing 10.

Accordingly, the tool retaining device in accordance with the present invention may be provided for changeably coupling or retaining different tool members or tool bits having different lengths.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A tool retaining device comprising: a housing including an engaging hole formed in a first end thereof and having a non-circular cross section, and including a chamber formed therein and communicating with said engaging hole of said housing, a tool stem slidably received in said chamber of said housing and including a socket opening formed therein and having a non-circular cross section, and a tool member engaged into said socket opening of said tool stem and slidably engaged in said engaging hole of said housing, said tool member including a non-circular cross section for engaging with said non-circular engaging hole of said housing and said socket opening of said tool stem and for allowing said tool member to be selectively rotated by said tool stem when said tool member is in a first position and by said housing when said tool member is in a second position, and said tool member being movable relative to said housing and selectively movable into said chamber of said housing.

2. The tool retaining device as claimed in claim 1 further comprising means for limiting said tool stem to move relative to said housing.

3. The tool retaining device as claimed in claim 2, wherein said limiting means includes a first limiting groove formed in said housing and communicating with the chamber of the housing, and a retaining ring engaged onto said tool stem for selectively engaging with said first limiting groove of said housing and for limiting said tool stem to move relative to said housing.

4. The tool retaining device as claimed in claim 3, wherein said housing includes a second limiting groove formed therein and communicating with the chamber of the housing for selectively engaging with said retaining ring.

5. The tool retaining device as claimed in claim 4, wherein said second limiting groove of said housing is located closer to said first end of said housing.

6. The tool retaining device as claimed in claim 3, wherein said housing includes a positioning groove formed therein and communicating with the chamber of the housing for selectively engaging with and for positioning said retaining ring to said housing.

7. The tool retaining device as claimed in claim 1, wherein said tool stem includes an aperture formed therein and communicating with said socket opening of said tool stem for receiving a bit detent ball therein, said bit detent ball is extendible into said socket opening of said tool stem for engaging with said tool member and for anchoring said tool member to said tool stem.

8. The tool retaining device as claimed in claim 7, wherein said housing includes a receiving groove formed therein and communicating with said chamber of said housing for selectively engaging with and receiving said bit detent ball and for allowing said bit detent ball to be selectively disengaged from said tool member.

9. The tool retaining device as claimed in claim 1, wherein said housing includes a cavity formed therein and communicating with said chamber of said housing for receiving a stem detent ball, said stem detent ball is extendible into said chamber of said housing for engaging with said tool stem and for anchoring said tool stem to said housing.

10. The tool retaining device as claimed in claim 9, wherein said tool stem includes a depression formed in an outer peripheral portion thereof for receiving said stem detent ball and for solidly anchor said tool stem to said housing.

11. The tool retaining device as claimed in claim 9 further comprising a control ferrule slidably attached onto said housing for selectively engaging with said stem detent ball and for anchoring said tool stem to said housing.

12. The tool retaining device as claimed in claim 11, wherein said control ferrule includes a receiving groove formed therein for selectively receiving said stem detent ball and for allowing said stem detent ball to be selectively disengaged from said tool stem.

13. The tool retaining device as claimed in claim 12, wherein said housing includes a retaining ring engaged onto said housing, and said control ferrule includes a limiting groove formed therein for selectively engaging with said retaining ring and for selectively retaining said stem detent ball in engagement in said receiving groove of said control ferrule.

14. The tool retaining device as claimed in claim 12, wherein said housing includes a retaining ring engaged onto said housing, and said control ferrule includes a limiting groove formed therein for selectively engaging with said retaining ring and for selectively retaining said stem detent ball in disengagement from said receiving groove of said control ferrule.

15. The tool retaining device as claimed in claim 1, wherein said housing includes an anchoring means for engaging with and for anchoring said tool member to said housing.

16. The tool retaining device as claimed in claim 15, wherein said anchoring means includes a spring-biased bit detent ball attached to said housing and extendible into said engaging hole of said housing for engaging with said tool member and for anchoring said tool member to said housing.

17. The tool retaining device as claimed in claim 16, wherein said housing includes a spring member engaged thereon and engaged with said bit detent ball for biasing and forcing said bit detent ball to engage with said tool member.

18. The tool retaining device as claimed in claim 1 further comprising a tool element selectively engageable into said engaging hole of said housing when said tool member is moved into said housing and received in said chamber of said housing.

19. The tool retaining device as claimed in claim 1, wherein said housing includes a magnetic member attached thereto for attracting a tool element to said housing.

20. The tool retaining device as claimed in claim 19, wherein said magnetic member includes a bore formed therein for slidably receiving said tool member.

* * * * *